United States Patent [19]

Phillips et al.

[11] Patent Number: 5,648,165
[45] Date of Patent: Jul. 15, 1997

[54] HOT STAMP ARTICLE FOR APPLYING OPTICALLY VARIABLE COATING TO SUBSTRATES

[75] Inventors: Roger W. Phillips, Santa Rosa, Calif.; Thomas Mayer, Boulder, Colo.; Gary S. Ash, Boston, Mass.

[73] Assignee: Flex Products, Inc., Santa Rosa, Calif.

[21] Appl. No.: 171,654

[22] Filed: Dec. 22, 1993

Related U.S. Application Data

[62] Division of Ser. No. 902,693, Jun. 23, 1992, Pat. No. 5,279,657, which is a continuation of Ser. No. 719,166, Jun. 21, 1991, Pat. No. 5,171,363, which is a continuation of Ser. No. 251,034, Sep. 26, 1988, Pat. No. 5,059,245, which is a continuation of Ser. No. 812,814, Dec. 23, 1985, abandoned, which is a continuation-in-part of Ser. No. 567,638, Jan. 3, 1984, abandoned, which is a continuation of Ser. No. 314,695, Oct. 26, 1981, Pat. No. 4,434,010, which is a division of Ser. No. 108,004, Dec. 28, 1979, abandoned.

[51] Int. Cl.⁶ .................. B32B 7/06; B32B 7/10; B32B 15/04
[52] U.S. Cl. .............. 428/346; 428/200; 428/202; 428/209; 428/352; 428/457; 428/914; 428/915
[58] Field of Search .................. 428/346, 347, 428/352, 203, 204, 207, 206, 200, 202, 208, 209, 210, 349, 354, 448, 450, 458, 914, 918, 457, 343, 344, 469, 915

[56] References Cited

U.S. PATENT DOCUMENTS

| | | | |
|---|---|---|---|
| 3,008,844 | 11/1961 | Grunin | 106/193 |
| 3,087,828 | 4/1963 | Linton | 106/291 |
| 3,123,490 | 3/1964 | Bolomey et al. | 106/291 |
| 3,858,977 | 1/1975 | Baird et al. | 356/71 |
| 3,962,397 | 6/1976 | Narui et al. | 264/144 |
| 4,101,698 | 7/1978 | Dunning et al. | 428/31 |
| 4,168,986 | 9/1979 | Venis, Jr. | 106/291 |
| 4,310,584 | 1/1982 | Cooper et al. | 428/212 |

*Primary Examiner*—Paul J. Thibodeau
*Assistant Examiner*—Vivian Chen
*Attorney, Agent, or Firm*—Flehr, Hohbach, Test, Albritton & Herbert

[57] ABSTRACT

An article for applying a color shifting optically variable coating on a substrate formed from a polymeric web, a release coating on the web and an optically variable coating wherein the optically variable coating consists of a semi-opaque metal layer adjacent to the release layer, a transparent dielectric layer on the semi-opaque metal layer and a reflective metal layer on the dielectric layer. The article can be bonded to a substrate by means of hot stamping with the hot stamp adhesive layer being applied to the article or applied to the substrate.

1 Claim, 7 Drawing Sheets

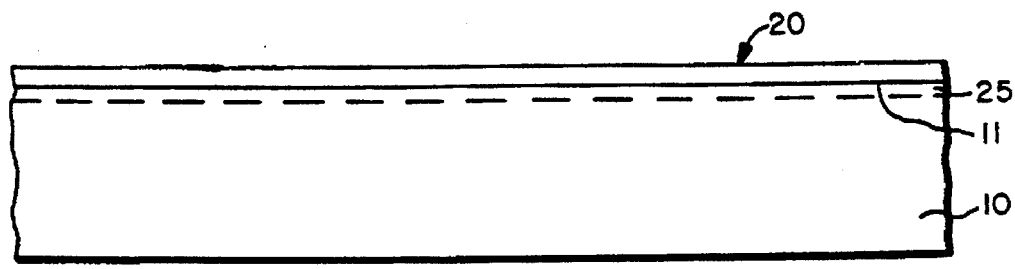
FIG.—1A
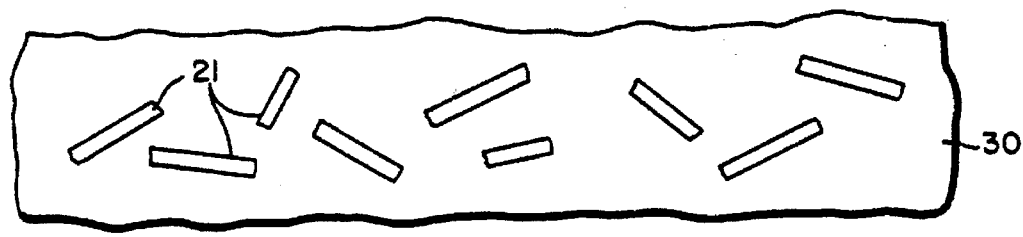
FIG.—1B
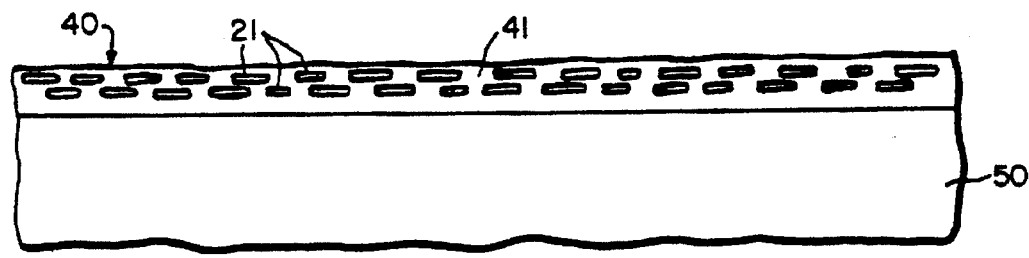
FIG.—1C
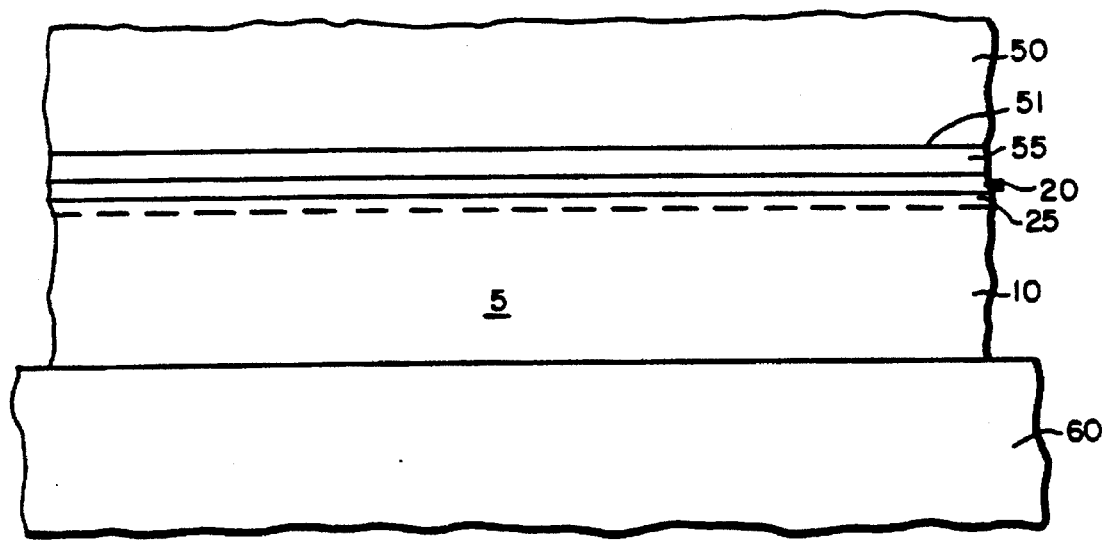
FIG.—1D

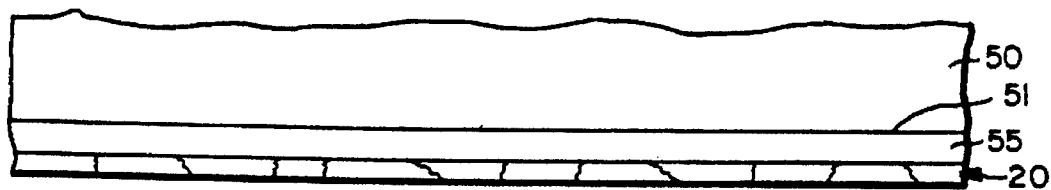
FIG.—1E
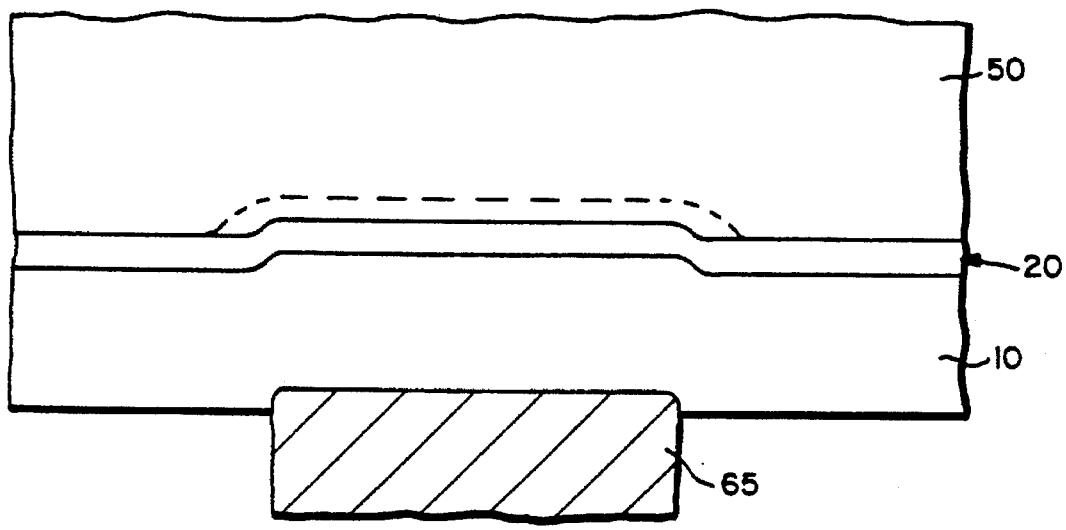
FIG.—1F
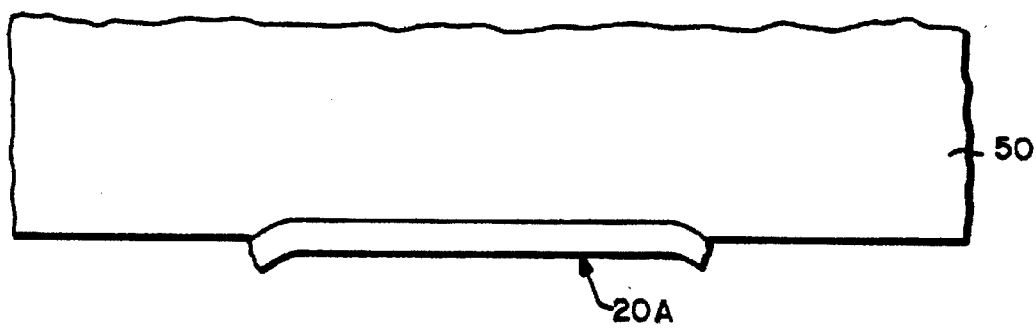
FIG.—1G

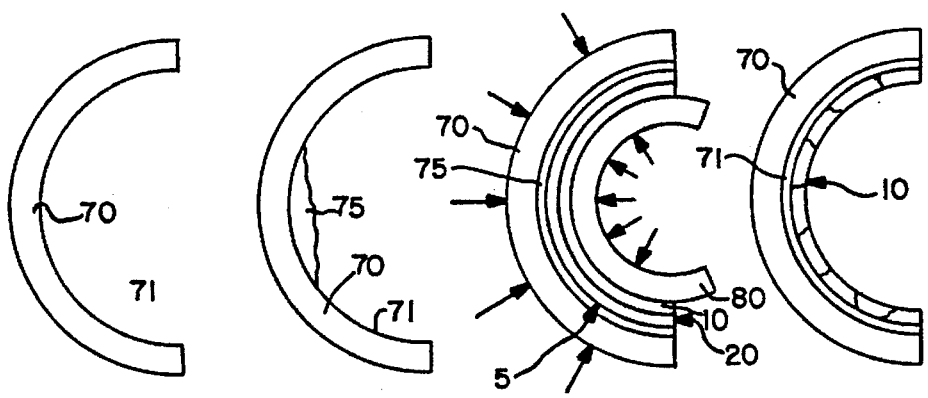
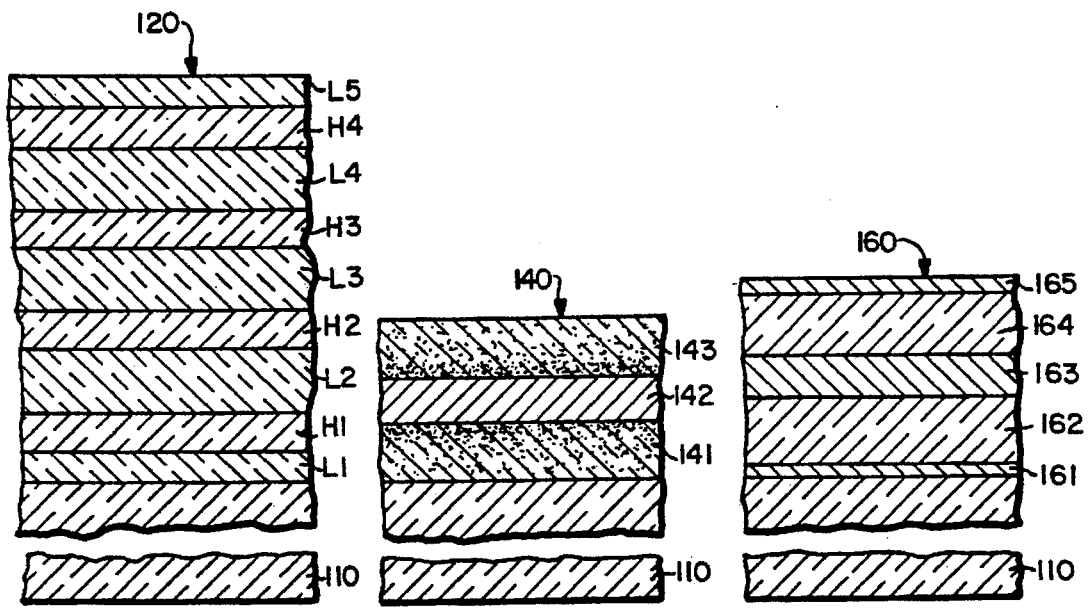
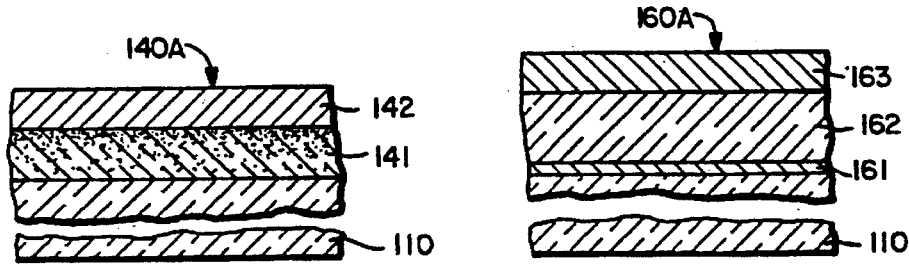

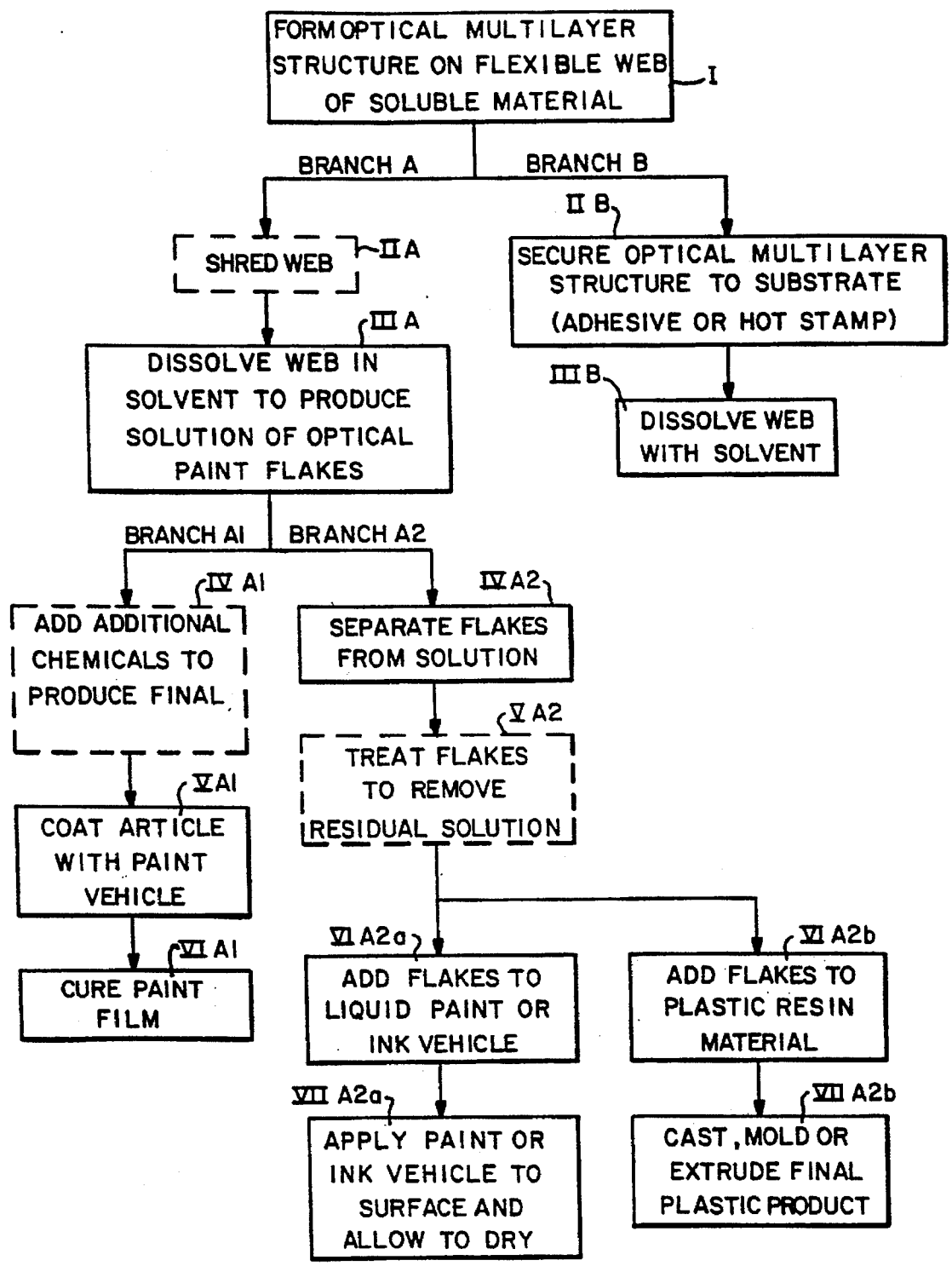
FIG.—4

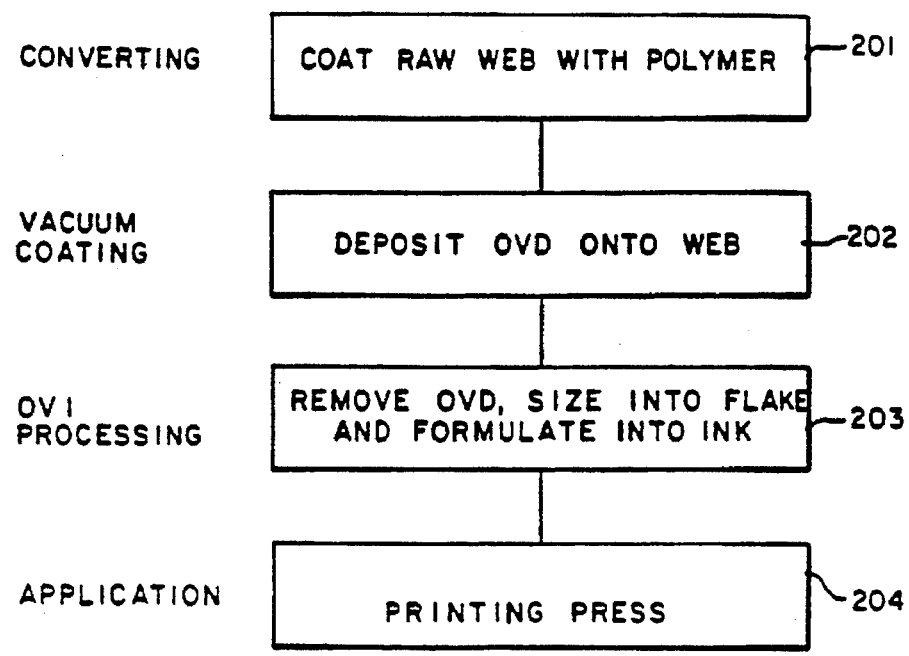
FIG.—5
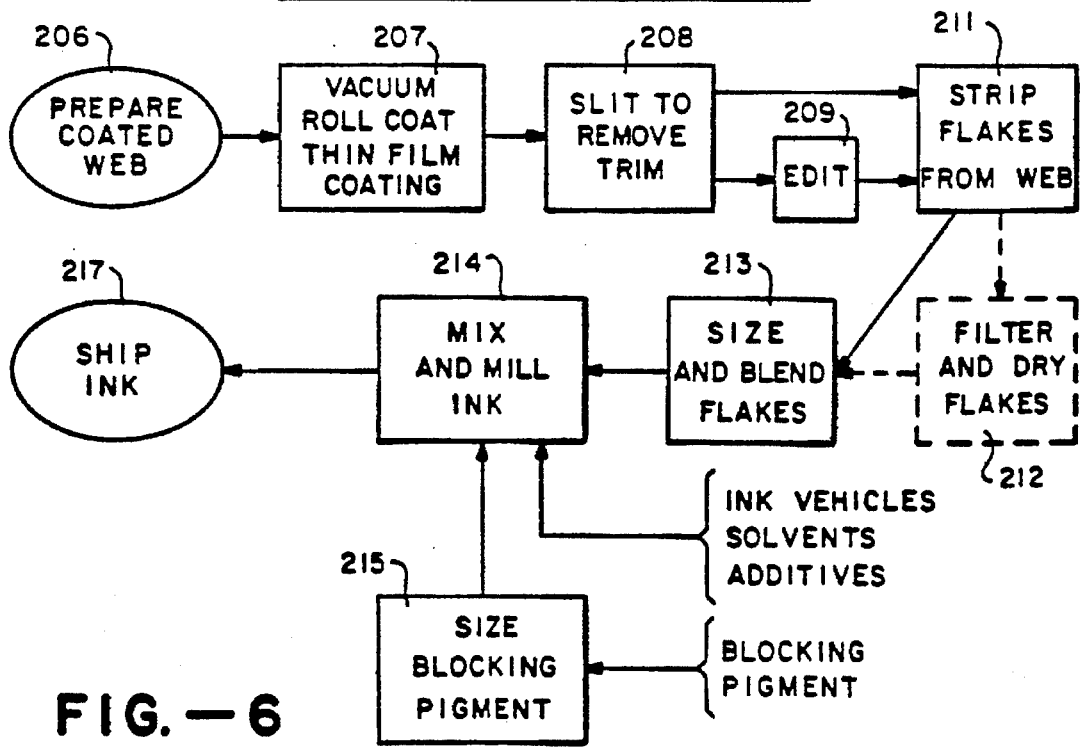
FIG.—6

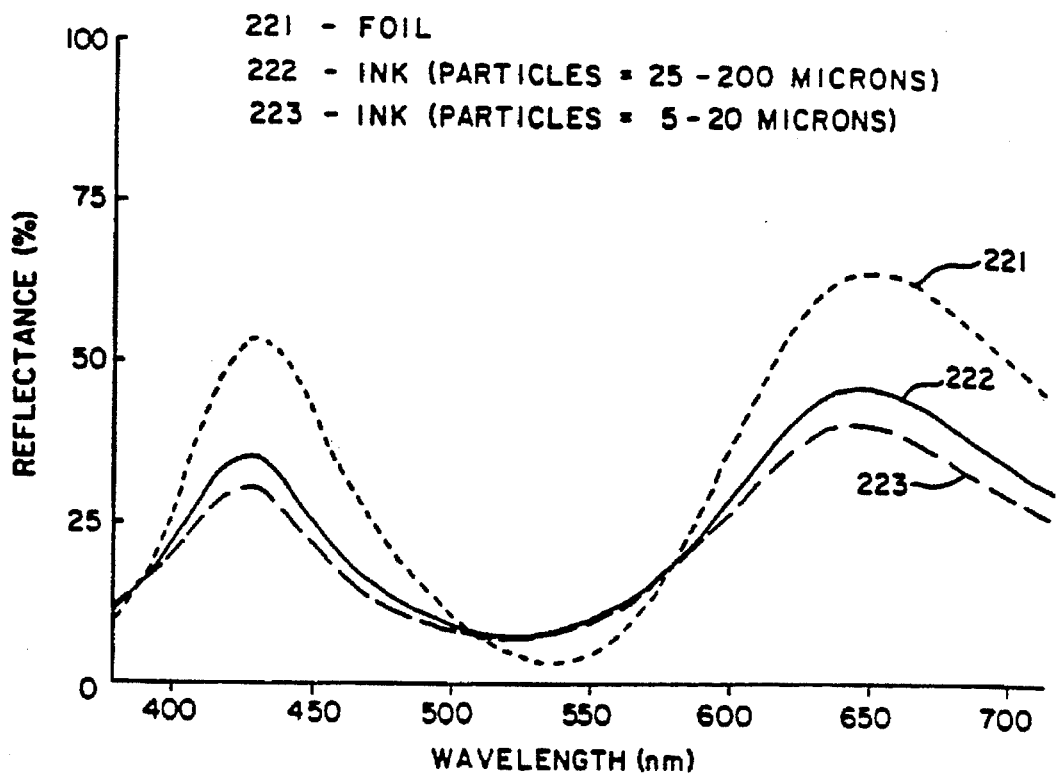
FIG.—7
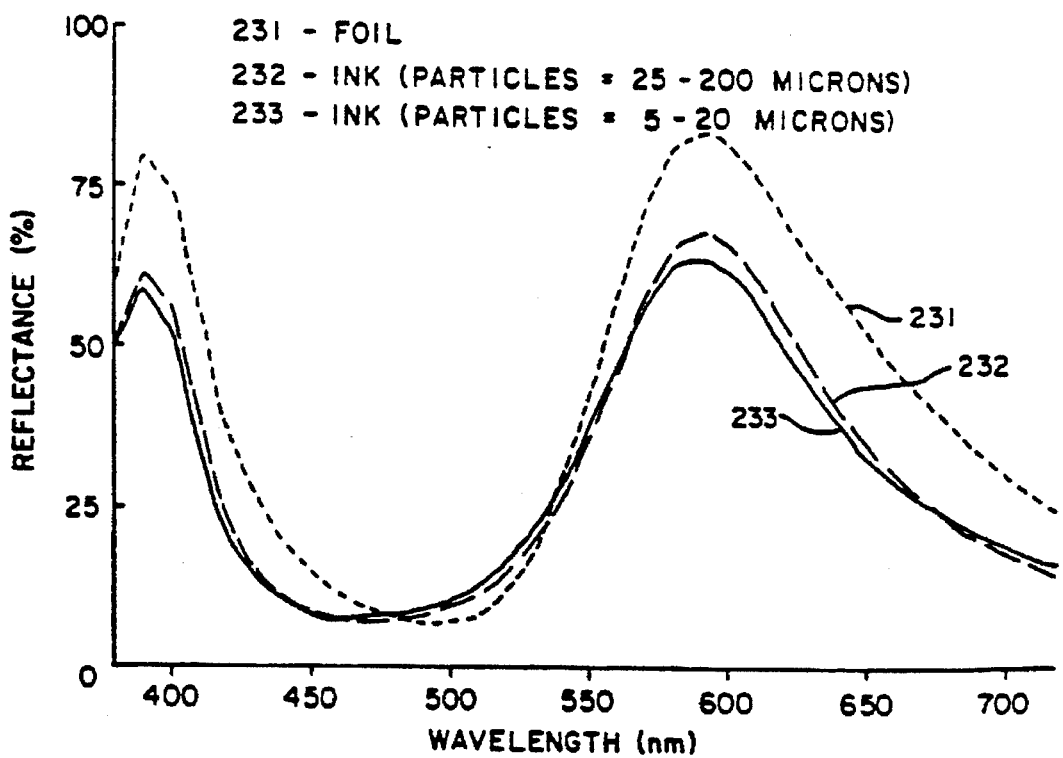
FIG.—8

HOT STAMP ARTICLE FOR APPLYING OPTICALLY VARIABLE COATING TO SUBSTRATES

This is a division of application Ser. No. 07/902,693, filed Jun. 23, 1992, now U.S. Pat. No. 5,279,657, which is a continuation of application Ser. No. 07/719,166, filed Jun. 21, 1991, now U.S. Pat. No. 5,171,363, which is a continuation of application Ser. No. 07/251,034, filed Sep. 26, 1988, now U.S. Pat. No. 5,059,245, which is a continuation of application Ser. No. 06/812,814, filed Dec. 23, 1985, now abandoned, which is a continuation in part of application Ser. No. 06/567,638, filed Jan. 3, 1984, now abandoned, which is a continuation of application Ser. No. 06/314,695, filed Oct. 26, 1981, now U.S. Pat. No. 4,434,010, which is a division of application Ser. No. 06/108,004, filed Dec. 28, 1979, now abandoned.

This invention relates to optical thin film flakes and coatings and inks incorporating the same and a method for making the same and more particularly to optically variable thin film flakes and inks incorporating the same used in anti-counterfeiting applications.

BACKGROUND OF THE INVENTION

In the past attempts have been made to make lamellar pigment materials in the manner disclosed in U.S. Pat. No. 4,168,986 with the desire to obtain improved specular reflectivity. There is, however, no disclosure as to how optically variable thin film flakes for incorporation into paints and inks can be produced. There is no disclosure as to how other types of optically variable thin flakes can be provided for use in coating and inks. There is therefore a need for new and improved optically variable thin film flakes, paints and inks incorporating the same and methods for producing the same.

SUMMARY OF THE INVENTION

In general it is an object of the present invention to provide optical flakes having improved characteristics and optical paints and optical inks incorporating the same and methods for making and using the optical flakes.

Another object of the invention is to provide optically variable flakes of the above character which are formed symmetrically.

Another object of the invention is to provide optically variable flakes of the above character which are formed from optically variable thin films.

Another object of the invention is to provide optically variable films of the above character which have the same light reflecting characteristics on both sides of the flakes.

Another object of the invention is to provide optically variable flakes on the above character which hare useful in making optically variably inks.

Another object of the invention is to provide optically variable inks of the above character which can be used with existing printing processes.

Another object of the invention is to provide optically variable inks of the above character in which the flakes are particularly adapted for use in Intaglio, letterpress, litho-offset press, silk screen or gravure printing.

Another object of the invention is to provide optically variable inks which are chemically durable.

Another object of the invention is to provide optically variable inks of the above character which use vehicles having cross linking polymers.

Another object of the invention is to provide an optically variable ink of the above character which can be post cured.

Another object of the invention is to provide optically variable flakes of the above character which can be utilized in paints.

Another object of the invention is to provide optically variable flakes of the above character which can be utilized in replicated optical coatings.

Another object of the invention is to provide a method for making optically variable flakes of the present invention by the use of soluble or insoluble flexible webs.

Another object of the invention is to provide a method of the above character in which the optically variable thin films can be separated from the web by dissolving a soluble web.

Another object of the invention is to provide a method of the above character in which the optically variable thin films can be separated from the web by providing a release coat between an insoluble web and the optically variable thin film and dissolving the release coat by use of a solvent.

Another object of the invention is to provide a method of the above character in which the optically variable thin film is physically separated from the web.

Another object of the invention is to provide a method of the above character in which the size of the optically variable thin film flakes are reduced to approximately 2 to 20 microns without substantially loss of color integrity.

Another object of the invention is to provide a method of the above character in which optically variable flakes have an aspect ratio of at least 2 to 1.

On aspect of this invention features an article adapted to be utilized in the production of optically variable ink, paint flakes, and replicated optical coatings. The article is comprised of a flexible web and an optical coating formed on one surface of the web. The web in one embodiment of the invention has the characteristic of solubility when immersed in a preselected liquid. In another embodiment of the invention the web is insoluble and a soluble release coat is disposed between the web and the optical coating.

In accordance with another aspect, this invention features an article adapted to be utilized in the production of optically variable paint and optically variable flakes wherein the optical coating is formed on one surface of a web and is a symmetrical optical multilayer structure such that the optical performance of the optical coating is the same for radiation incident thereon from both directions. This symmetrical optical multilayer structure may be either a symmetrical stack of transparent dielectric layers or transparent dielectric and semi-transparent metallic layers, or it may comprise a pair of optical substructures formed on each side of an opaque layer of reflecting material, the bottom optical substructure being inverted and the top non-inverted.

Another aspect of this invention features an article adapted to be utilized to form an optically variable coating on a preselected article wherein the article comprises a flexible web of preselected material and an optically variable coating formed in an inverted fashion on one surface of the web. The optically variable coating is adapted to be secured to the web either directly or over a release layer and the preselected material of the web is adapted to be thereafter separated from the optically variable coating either by dissolution of the web or the release layer material.

Another aspect of this invention features an improved method step for producing an ink or a paint having preselected optical properties when applied to a surface. The steps comprise forming an optically variable coating structure directly on a flexible web of material which in one embodiment the web is soluble in predetermined liquid and in another embodiment the web is insoluble but a release layer is soluble and then immersing the web in a predetermined liquid to dissolve the web or the release layer and produce a multiplicity of optically variable flakes each having the optically variable coating structure. An alternative aspect of the invention features additional steps of separating the flakes from the resulting solution and adding the separated flakes to a preselected liquid ink or paint medium.

Another aspect of this invention features a method for forming a replicated optically variable coating structure on a surface of a substrate which involves the steps of forming an inverted version of the optical coating structure directly on a soluble flexible web of material or onto a soluble release coat on an insoluble flexible web of material, securing at least a portion of the optically variable coating structure to the surface of the substrate, and then dissolving the soluble flexible web of material or the soluble release coat on the insoluble flexible web to separate the optical coating structure from the flexible web, and leaving the optically variable coating structure adhered to the substrate surface.

This invention has the advantage of enabling the production of flakes of an optically variable coating which can be utilized in substantially replicating the optically variable coating and its optical performance by applying a paint or an ink medium containing the optical flakes to the surface of an article. This invention also has the advantage of providing an article which can be easily utilized by a manufacturer of an article to replicate an optically variable coating simply by gluing the optically variable coating on the flexible web to the surface of the article and separating the optically variable coating from the web. This avoids the manufacturer having to send an article to another location or company for the application of the optical coating. The invention enables production of dichroic paint utilizing a symmetrical optically variable multilayer which yields strongly saturated different colors. This dichroic paint may be used in decorative coatings, specialty paints, decorative inks, security inks and decorative plastics.

This invention also has the advantage of enabling the production of optical coatings which produce either a hot mirror or cold mirror optical performance. Hot and cold mirrors are utilized to separate heat and light in the spectrum of radiation incident thereon. The optical coatings produced by the optical paint in accordance with this invention may readily be used in non-imaging applications of hot and cold mirrors and other edge filter type coatings.

This invention also enables the production of a selective solar absorber paint by utilizing known optical coating structures having a selective solar absorbing characteristic. Such a paint is readily applied to appropriate control surfaces in a passive solar energy system. The thermal emittance characteristics of the paint will generally not be as good as the coating itself since it will be strongly influenced by the infrared absorption spectra of the paint vehicle itself.

Other features and advantages of this invention will be apparent from a consideration of the detailed description set forth below in conjunction with the accompanying drawings.

BRIEF DESCRIPTION OF THE DRAWINGS

FIG. 1 is a cross sectional view of an article made in accordance with the present invention adapted to be utilized in the production of optically variable flakes, and replicated optically variable coatings.

FIG. 1B is a cross sectional view of a solution containing a dispersion of optically variable flakes made in accordance with the present invention.

FIG. 1C is a cross-sectional view of an optically variable paint layer formed on the surface of an article and containing optically variable paint flakes made in accordance with this invention.

FIG. 1D is a elevational view in cross section showing one step in the production of a replicated optically variable coating in accordance with this invention.

FIG. 1E is a elevational view in cross section of a replicated optically variable coating made in accordance with this invention.

FIGS. 1F and 1G are cross sectional views which depict the steps of adhering an optically variable coating to a substrate with a hot stamping process.

FIGS. 2A-2D are cross sectional views which depict the steps in the formation of a replicated optically variable coating in accordance with this invention on a curved surface of an article.

FIGS. 3A-3E are cross-sectional views of alternative exemplary embodiments of articles made in accordance with this invention which are adapted to be utilized in the production of optically variable paint, optically variable inks, optically variable flakes, and replicated optically variable coatings.

FIGS. 4 is a process flow chart depicting various sequences of method steps for producing optically variable paint, optically variable paint flakes, and replicated optically variable coatings in accordance with this invention.

FIG. 5 is a flow chart showing the optically variable ink process.

FIG. 6 is a flow chart showing the optically variable ink manufacturing process.

FIG. 7 is a graph showing the reflectant of a magenta-to-green shifter at 10° incidence.

FIG. 8 is a graph showing the reflectance for a gold-to-green shifter at 10° incidence.

DESCRIPTION OF THE PREFERRED EMBODIMENTS

Figure 9:
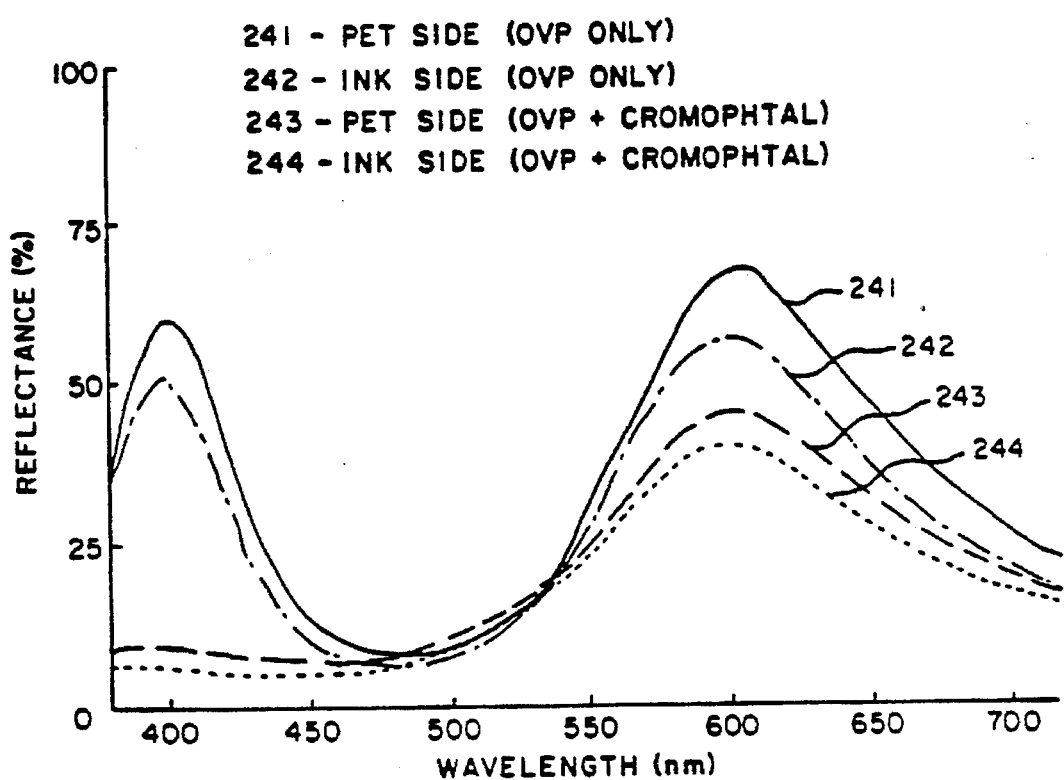
FIG. 9 is a graph showing the reflectance of a gold-to-green shifter with and without a blue-light blocking pigment.

In the method which is utilized for providing optically variable flakes, a flexible web of material having an exposed surface is provided. An optically variable coating is provided on the surface of the web. The coating is separated from the web to produce a plurality of flakes of the optically variable coating. The size of the flakes is adjusted for the particular application, i.e., paint or printing ink desired. The optically variable flakes are then placed in a liquid vehicle. The liquid vehicle is then applied to a substrate and dried to provide a film which has a light characteristic which is substantially provided by the optically variable flakes.

The optically variable flakes of the present invention can take a number of different forms. In the case of optically variable inks for high resolution printing, the optical flakes have a size in the range of approximately 2 to 20 microns and have substantially the same light reflecting characteristic on both sides of the flakes. For other types of applications, such as in paints or in wide area printing, the size of the flakes may range up to 200 microns.

More in particular as shown in the drawings, the optically variable flakes for use in paints, inks and the like and replicated optically variable coatings are made by the use of an article 5 shown in FIG. 1A. Article 5 is comprised of a flexible web 10 and an optically variable coating 20 formed on a surface 11 of the flexible web and will, for convenience, be called a coated web 5. As will be discussed in more detail below, optically variable coating 20 may take various forms depending on the desired optical performance of the optically variable paint, optically variable ink, optically variable coatings to be produced from coated web 5. Flexible web 10 comprises a material which is in one embodiment soluble when immersed in a preselected liquid. In another embodiment the web is insoluble and a soluble release coat is utilized.

FIGS. 1B and 1C depict the utilization of the coated web 5 of FIG. 1A in the formation of optically variable ink or paint for application to the surface of an article. For purposes of producing optically variable paint flakes for use in an optically variable paint, coated web 5 in one embodiment utilizes a web 10 of a material which is soluble in a predetermined liquid.

For example, web 10 may comprise a film of polyvinyl alcohol which is soluble in water. Other web materials which are water soluble and may also be utilized in this application are polyethylene oxide and methyl-hydroxy-propyl cellulose. In addition acrylic plastic materials such as polymethyl methacrylate which are soluble in organic solvents such as acetone or methyl ethyl ketone may be employed.

FIG. 1B depicts a dispersion of optically variable flakes 21 in a solution 30. Each of the individual optically variable flakes 21 comprises a small segment of optically variable coating shown in FIG. 1A. These flakes are formed as optical coating 20 breaks into small pieces when the support of web 10 is removed. The size of the flakes depends upon the stress in optical coating 20, the materials and layer thicknesses and the degree of any agitation or grinding of the syrup-like solution in which they are suspended. The solution 30 comprises a mixture of the chemical material of web 10 and the solvent in which that material has been dissolved resulting in a solution containing a dispersion of the optically variable flakes 21. This solution may be utilized directly as an optically variable paint. In other instances the composition of the paint may be altered by the addition of other chemicals in order to produce a paint of desired characteristics. This invention is not restricted to any particular paint formulation and any formulation which results in a layer of paint sufficiently transparent to permit the optically variable paint flakes to perform their function can be utilized.

As an alternative to utilizing the solution 30 of the material of the web 10 and the liquid in which web 10 is dissolved directly as a part of the paint vehicle, the optically variable flakes 21 may be separated from solution 30 and then utilized as optically variable paint pigments. For example, the separated optically variable paint flakes can be added to another liquid paint vehicle to form an optically variable paint of desired characteristics. Another alternative is to incorporate the optically variable paint flakes in a plastic material which may then be case, molded or extruded into a final article.

FIG. 1C depicts an optically variable paint layer 40 applied of the surface of an article 50. Optically variable paint layer 40 comprises a paint vehicle 41 which generally has a transparent characteristic so that radiation incident on the surface of the paint layer 40 can reach the individual optically variable flakes 21 dispersed in the paint vehicle 41. As depicted in FIG. 1C the layer of optically variable paint 40 will generally have one or more layers of optically variable paint flakes 21 lying near the surface of the paint layer with individual flakes overlapping each other. The concentration of optically variable paint flakes 21 in paint vehicle 41 will determine the number of layers of flakes and the degree of coverage of the substrate. In the case of opaque flakes, no change in performance will be produced after the substrate surface is fully covered with flakes; but for all dielectric coatings and semitransparent metal-dielectric coatings, increased flake concentration resulting in multiple overlapping layers of flakes may improve performance. The individual flakes will be of a variety of sizes and shapes but will generally lie parallel to each other due to surface tension in the paint vehicle. Generally, the original spectral characteristics of the optically variable coating 20 formed on web 10 (FIG. 1A) will be retained in the final paint film 40. The final optical characteristics of the paint film 40 will be determined by the optical characteristics of the paint vehicle 41 together with those of the optically variable paint flakes. Accordingly, color dyes and other materials may be added to the liquid paint vehicle to alter the overall optical performance of paint film 40.

FIGS. 1D and 1E depict the utilization of coating web 5 of FIG. 1A in the formation of a replicated optical coating. FIG. 1D shows coated web 5 cemented with a thin layer of adhesive 55 to surface 51 of another article 50. This structure would generally be produced by putting a small quantity of the adhesive of layer 55 on surface 51 of article 50, laying the coating web 5 on surface 51 with optical coating 20 in contact with the adhesive material of layer 55 and then utilizing a flat plate such as plate 60 to press coated web 5 against the adhesive material to spread it into a uniform thin layer 55. Once the adhesive material 55 has cured, the web 10 may be separated from optical coating 20, leaving optical coating 20 adhered to surface 51 of article 50 as depicted in FIG. 1E.

The dissolution of web 10 from optical coating 20 after it has been cemented to surface 51 can be accomplished in two alternative ways. Dissolution of web 10 can be accomplished by immersing the article 50 in a liquid which dissolves web 10, or the surface of article 50 can be flushed with solvent to gradually dissolve the web 10 away from the optical coating 20.

As depicted in FIG. 1E, optical coating 20 is likely to have a cracked appearance either due to the handling of coated web 5 prior to cementing it to the surface of article 50 or due to the stresses to which optical coating 20 is subjected in the process of being pressed into adhesive layer 55. On the other hand, careful handling of coated web 5, together with careful spreading of the adhesive 55 prior to pressing the coated web 5 into it, may enable a crack-free replicated optical coating 20 to be produced. In general, however, coated web 5 will have its principal utility in non-imaging applications in which the appearance of the final optical coating is immaterial and sufficient optical performance is attainable even with cracks in the coating.

FIGS. 1F and 1G depict the formation of a section 20A of an optical coating on a substrate 50 utilizing a well-known hot stamping process in which a heated die 65 is utilized to press the coating 20 into contact with a plastic surface to cause it to adhere. The soluble web 10 may then be dissolved away, or in the case of an insoluble web with a release coating, the web is physically stripped away, leaving the adhered section of the coating. Additional details of a hot stamping process generally may be found on pages 440–445 of the Modern Plastics Encyclopedia, 1979–1980.

FIGS. 2A–2D depict the formation of a replicated optical coating on a curved surface of article 70 utilizing coated web 5. The approach generally involves a matched mold technique in which the article 70 to be coated is one of the molds and the cylindrical mold 80 is the matching mold. Since coated web 5 is flexible it can be bent to conform to the surface of article 70. The process of replicating the optical coating starts with the placement of a layer of an epoxy adhesive 75 or other adhesive material on surface 71 of article 70. Then coated web 5 is placed in contact with the small amount of adhesive 75 and the complimentary mold 80 is utilized to press coated web 5 into conformity with the configuration of surface 71 while simultaneously spreading the adhesive 75 into a uniform thin layer. Thereafter, the adhesive material 75 is cured, the complimentary mold 80 is removed and then web 10 is separated from optical coating 20. Separation of web 10 from optical coating 20 can be performed be dissolving web 10 away from optical coating 20 or by simply peeling it away after the adhesive has cured. These approaches are discussed in more detail above and need not be repeated here.

It should thus be apparent that the coated web 5 depicted in FIG. 1A can be utilized in a variety of ways to produce modestly performing optical coatings. Individual sheets or rolls of coated web 5 depicted in FIG. 1A can be produced. These individual sheets or rolls of the coated web 5 may then be transformed into optical paint to be utilized in coating articles at another facility. The manufacturer of an article which requires a modestly performing optical coating need not interrupt its production process to ship the article to another company for application of the coating. Instead, optical paint containing the optical paint flakes produced from coated web 5 in FIG. 1A may be applied directly by the manufacturer to its own product.

Similarly, coated web 5 can be supplied to manufacturers who wish to provide replicated optical coating such as depicted in FIGS. 1E, 1G and 2D. The individual sheets or rolls of the coated web may be cut or stamped to a desired shape and then utilized in the manner depicted in FIGS. 1D and 1E or FIGS. 2A through 2D to form replicated optical coatings. This approach also avoids having to send the articles to an optical coating facility, thereby making the overall manufacturing of a particular article more efficient and less costly.

FIGS. 3A–3E depict exemplary types of optical coatings which may be utilized as optical coating 20 on coated web 5 in FIG. 1A in order to provide a particular optical performance. FIG. 3A depicts a dielectric stack 120 formed on flexible web 110. Dielectric stack 120 comprises alternate layers of a low refractive index material L1–L5 and a high refractive index material H1–H4. A wide variety of low and high index materials known in the art could be used in this optical multilayer. Exemplary combinations are zinc sulfide with magnesium fluoride and titanium dioxide with silicon dioxide. A variety of other dielectric materials could also be used, such as germanium, silicon, indium oxide and silicon monoxide. The design of this dielectric stack may be expressed as follows: $(L/2\ H\ L/2)^4$, where L and H designate a quarter-wave optical thickness of the low and high index layers, respectively, such that L/2 represents an eight-wave optical thickness of the low index layer. As depicted in FIG. 3A the resulting dielectric stack starts with a layer of low index material L1 which has an eightwave optical thickness followed by a quarterwave high index layer and then a quarterwave low index layer comprising two eightwave layers. By forming the optical multi-layer 120 with this design and centered at an optical wavelength of 650 to 670 nanometers, a short wave-pass filter is produced. A short wave-pass filter is also known as a hot mirror since it has high reflectance for wavelengths longer than 600 nanometers and thus readily transmits visible light but reflects incident infrared radiation.

A cold mirror can be produced utilizing the same dielectric stack design centered at a wavelength of about 500 nanometers. An optical coating according to this design will transmit the infrared portion of the spectrum of incident radiation and reflects the visible light incident thereon.

Optical coating 120, when transformed into optical paint chips, can thus be utilized to produce certain types of hot mirrors, cold mirrors, or other selective reflectors. In addition flakes of optical coating 120 could be utilized as dichroic paint flakes, although the reflective colors are unsaturated. Since the optical coating 20 is symmetrical, it can be utilized either in the formation of optical paint flakes or in the formation of replicated optical coatings.

FIGS. 3B and 3D depict optical coatings 140 and 140A which have the property of selective solar absorption. The optical coatings 140 and 140A generally characterize the different approach that is preferably taken in forming an optical coating structure to be utilized in the production of optical paint flakes and an optical coating structure which will be utilized in forming a replicated optical coating. As shown in FIG. 3B optical coating 140 comprises a symmetrical optical multilayer comprising cermet layers 141 and 143 formed on opposite sides of a central layer of reflecting material 142. Each of the cermet layers 141 and 143 have a graded ceramic-to-metal ratio but the grading of layer 141 is the inverse of the grading of layer 143. Thus the percentage of metal in cermet layer 141 is greater at the top portion of the layer adjacent the metal reflecting layer 141 whereas in cermet layer 143 the high metal ratio portion is the lower portion adjacent reflecting layer 142. It will thus be appreciated that the performance of optical coating 140 is the same regardless of whether radiation is incident on layer 143 or layer 141. This is preferable in the production of optical paint flakes since obviously the optical paint flakes may end up being oriented either right side up or upside down in the final paint film. The utilization of a cermet layer formed on metal reflecting layers to provide selective solar absorption is known. In an application of H. Gurey entitled SELECTIVE SOLAR ABSORBER AND STRUCTURE INCORPORATING THE SAME, Ser. No. 86,076, field on Oct. 18, 1979, now abandoned, exemplary materials and approaches to forming cermet layers which may be utilized as layers 141 and 142 are set forth. Portions of the Gurev application dealing with formation of cermet layers are incorporated herein by reference. The Gurev application also discloses an inteference type of optical coating which produces selective solar absorption and which could be used in this application.

Optical coating 140A depicted in FIG. 3D comprises simply a single cermet layer 141 on web 110 with a layer 142 of reflecting metal formed on top of cermet layer 141. Optical coating 140A is thus preferred for use in formation of a replicated optical coating due to the inverted structure thereof. In other words, in the final optical coating formed by cementing optical coating 140A to another surface, the cermet layer will then be exposed to incident radiation.

FIGS. 3C and 3E depict optical coatings 160 and 160A which may be utilized to produce strongly dichroic optical effects. Optical coating 160 is a symmetrical design comprising therein, semi-opaque metal layer 161 formed on web 110 followed in sequence by a dielectric layer 162, a metal reflecting layer 163, another layer of dielectric material 164 and a final thin, semi-opaque metal layer 165. The metal and dielectric opaque metal layer 165. The metal and dielectric layers 161 and 162 from an optical coating substructure which is an inverted version of the optical coating substructure comprising layers 164 and 165. Each of the thin metal layers 161 and 165 comprise a nominal five nanometer thick layer of chromium. Each of the layers 162 and 164 are formed from a dielectric material such as silicon dioxide to a halfwave optical thickness at a particular design wavelength. Metal reflecting layer 163 may comprise a layer of aluminum formed to a thickness of about 300 nanometers. While a layer of reflecting metal of greater thickness could be utilized, it is believed that a thinner layer is preferable to minimize the stress in this layer which, if too great, can cause the optical paint flakes later produced to curl at the edges and degrade the optical performance of the optical paint. A variety of other materials could be utilized in place of those specifically set forth above. For example, instead of using chromium for the thin metal layers 161 and 165 materials such as nickel and Inconel would also be utilized. Instead of silicon dioxide for the dielectric layers 161 and 164 materials such as magnesium fluoride, and aluminum oxide could also be used. Finally, instead of aluminum as the metal reflecting layer 163 materials such as gold, copper and silver could be used for this purpose.

Dielectric coating 160A shown in FIG. 3E is similar in design to dielectric 160 in FIG. 3C but without the optical multilayer substructure comprising the layers 164 and 165. Thus the optical coating 160A is preferred for use in forming replicated optical coatings where an inverted optical coating substructure alone is required.

Specific examples of optically variable coatings having deep green and purple hues, respectively, were made utilizing the design of coating 160 shown in FIG. 3C. The deep green coating was made utilizing a halfwave silicon dioxide layer at a wavelength of 515 nanometers. This produces an optically variable coating with a fourth order reflectance maxima at 515 nanometers. A narrow band reflectance spike with about ninety percent reflectance at the 515 nanometer wave-length results with nearly zero reflectance at nearby wave lengths. Although second and sixth order reflectance maxima occur in the near infrared region and the short wavelength blue regions, the coating still produces a very saturated green color. Due to the low refractive index (1.46) of the halfwave silicon dioxide layer and its high order, a large amount of color shift occurs with changes in the viewing angle of the coating. At a viewing angle of about 45 degrees, the fourth order peak shifts into the blue region, and the second order peak shifts downscale into the red, leaving a low reflectance in the 515 nanometer green region. Accordingly, the apparent color of the coating changes from a deep green to a purple as the angle of viewing increases.

A second example of optically variable coating design 160 shown in FIG. 3C was constructed with a silicon dioxide halfwave layer at about 450 nanometers. This coating had a fourth order reflectance peak in the red part of the spectrum and a sixth order peak in the blue part of the spectrum which produced a deep purple color when viewed at normal incidence. When viewed at larger angles, the fourth order peak moved into the green region with low reflectance in the blue and red. This causes the apparent color of the coating to shift from purple to green at large viewing angles. A number of other colors may be produced simply by modifying the design thickness of the halfway silicon dioxide layer.

The dichroic paint effects of the optically variable chips produced in accordance with this invention can be combined with certain dye colors added to the suspension of these flakes in a paint medium in order to produce other colors with other color-shifting effects. In addition, the dichroic optically variable flakes produced in accordance with the design of FIG. 3C may be incorporated with other matching or contrasting standard paint pigments to achieve other color effects. The techniques for mixing paint pigments and obtaining various effects thereby are well known in the paint industry and need not be discussed in detail here.

FIG. 4 depicts a sequence of method steps which may be performed in order to produce optical paint, optical paint flakes, and replicated optical coatings in accordance with this invention. In each case, the method generally starts with Step I involving the formation of an optical coating, typically an optical multilayer structure, on a flexible web of soluble material. Exemplary optical coatings were formed on 3 mil thick sheets of water-soluble polyvinyl alcohol resin obtained from the MONO-SOL Division of Chris-Craft Industries, Inc., (407 County Line Road, Gary, Ind. 46403). In particular, type 1-000 film in sheets approximately ten inches square were utilized.

After Step I, the process either follows Branch A, if optical paint or optical paint flakes are to be produced, or Branch B, if a replicated optical coating is to be produced. Consider first the steps in Branch A. Step IIA is an optional step of shredding the flexible web into strips. In an exemplary process, the sheets of polyvinyl alcohol film were chopped into one-quarter-by-one-inch strips in order to reduce the size of the web so that it could be readily dissolved in a smaller container. This step is optional since, obviously, the web can be dissolved in any size container.

The next step, Step IIIA, is to dissolve the web in a predetermined solvent. In an exemplary process, the shredded strips of the web were dissolved in a flask containing fifty cubic centimeters of water at a temperature of 160° F.

After Step IIIA, the process follows either Branch A, is optical paint is to be produced, or Branch B, if optical paint flakes are to be produced. Consider first and steps of Branch A1. The next step, designated Step IVA1 is an optional one or adding additional chemicals to produce a final paint vehicle. In an exemplary process, Step IVA1 involves adding a surfactant material together with a cross-linking resin material and a catalyst. In the exemplary process, two drops of a surfactant were added together with 0.5 grams of Beetle 60 urea resin (from American Cyanamid) to the dissolved web material in the flask. The polyvinyl alcohol film dissolved rapidly in the flask and the overall mixture was stirred at the 160° temperature for about one-half hour. Then the mixture was allowed to cool to room temperature. Thereafter, one drop of a catalyst was added and the mixture was stirred for fifteen more minutes.

The next step, Step VA1, is to coat an article with the paint vehicle containing the optical flakes. In the exemplary process, the resulting paint solution was painted onto glass plates, paper file cards, wooden tongue depressors, and small metal articles, and the paint coating was allowed to dry for three or four hours.

Step VIA1 involves curing the paint film. For some paint vehicles the paint film cures as it dries and no further processing is necessary. In the exemplary process, the resulting paint films were baked at about 250° F. for 20 minutes. This baking promotes a chemical reaction causing a crosslinking of the polyvinyl acetate resin and the urea resin, producing a resulting film which is generally insoluble. Good adhesion and good coverage of the resulting paint film was obtained on the porous substrates. On glass and metal materials, the adhesion and coverage were not as good but could readily be improved through the use of initial primer coats or different paint formulations.

Consider now Branch A2 involving steps to produce optical thin film flakes. Step IVA2 involves separating the optical thin film flakes from the solution in which they are dispersed. This can be performed by centrifuging the dispersed flakes. Step VA2 is an optional step of treating the flakes to remove any residual solution. This step need not be performed is the residual solution on the flakes is not detrimental to performance of the final product. This step can be accomplished simply by washing the polyvinyl alcohol resin or other solution off of the optical paint flakes and then drying the flakes either at room temperature or by heating.

Having collected the optical flakes, they can not be added to another liquid paint or ink vehicle as Step VIA2a, or the flakes may be added to a plastic resin material as in Step VIA2b. Following Step VIA2a, Step VIIA2a involves applying the paint or ink vehicle to a surface and permitting it to dry. Following Step VIA2b, Step VIIA2b involves molding or extruding a final plastic product containing the optical flakes.

Consider now the steps in Branch B for forming a replicated optical coating. The second step, Step IIB, comprises securing the optical coating to a substrate with an adhesive material or with a hot stamping process. In an exemplary process, a glass plate having dimensions approximately two inches by two inches by 1/16 inch was utilized as the substrate. A few drops of a UV-cure cement were deposited on one surface of the glass plate. A piece of polyvinyl alcohol web with an optical coating thereon was pressed into the cement with the optical coating side down, and a second glass plate was pressed against the back of the polyvinyl alcohol film to flatten the piece of web and to spread the cement into a thin layer. This part was then subjected to ultraviolet light to cure the cement.

The third step in Branch B, Step IIIB, generally involves the dissolution of the web away from the optical coating. In an exemplary process, the substrate with the optical coating and polyvinyl alcohol film cemented thereto was immersed in boiling water for ten minutes to dissolve the web. A small amount of Merpol surfactant was added to the water to promote dissolution of the film. This approach successfully removed a polyvinyl alcohol film from an optical multilayer coating which involved a top layer of chrome cemented to a glass surface.

Another process for making an optically variable ink (OVI) is shown in FIG. 5. As shown therein in a converting step 201, the flexible web is coated with a solvent soluble polymer. The web is formed of a suitable insoluble flexible material using polyethyleneterphthalate (PET), or alternatively using polymers such as polycarbonates. By way of example, a 142 gauge polyester web can be utilized. The web is coated with an acrylic based polymer. One acrylic based polymer found to be satisfactory is one designated as 517-1 and is manufactured and sold by Thermark Division of Avery International located at Schereville, Ind. The acrylic based polymer is applied to the web in a suitable manner such as by gravure coating and dried in force air dryers. The polymer coat applied to the web is soluble in at least one solvent. Examples of suitable solvents are acetone and methethylketone. It should be appreciated that other than acrylic polymers, other materials can be utilized for a release layer. For example, instead of using a soluble hardcoat as provided by the acrylic polymer, it is possible to evaporate a thin film coating onto the web which would be soluble in certain liquids. Such a thin layer could be sodium fluoride or sodium chloride which could be dissolved with water. Also it should be appreciated that other release layers which have very low adhesion could be utilized which would permit mechanical removal of the optically variable thin film either by the use of a vacuum or by the use of air jets.

After the converting step 201 has been carried out, the flexible web can be placed in a vacuum coating chamber for performing the vacuum coating step consisting of depositing an optically variable device (OVD) or optical thin film onto the web as shown by step 202. The optical variable device can be an optical multilayer structure of the type hereinbefore described. Alternatively, it can be of the type described in co-pending applications Ser. No. 630,414 filed Jul. 13, 1984, now U.S. Pat. No. 4,705,356 and 640,141, filed on Jul. 13, 1984 abandoned. Optical variable devices of this character can be deposited onto the web in a conventional manner in a vacuum chamber such as by the use of electron beam and resistive heating sources as well as by sputtering.

After the multilayer coating has been deposited on the flexible web, in the vacuum coating process, the soluble polymer layer and the adhering thin film which forms the optically variable device is stripped from the carrier web. This can be accomplished batch wise or in a continuous fashion as shown by step 203 by passing the web through a bath of a suitable solvent, such as acetone. As the soluble polymer layer is dissolved by the acetone, the thin film is separated from the web mechanically. As the thin film is being removed, it breaks into optical flakes which are of a size on the order of 50 to 200 microns. If a continuous process is being used, the web as it emerges from the solvent, can be engaged by a metal doctor blade to mechanically separate any remaining thin film from the web.

The optical flakes, after they have been removed from the carrier web either in a batch process or a continuous process are then reduced in size as hereinafter described and formulated into an ink as shown by step 203. Thereafter, the ink can be utilized in various printing processes as shown by step 204.

A more detailed manufacturing process for making optically variable ink from an optical variable device manufactured in the manner hereinbefore described is shown in FIG. 6. As shown therein, the soluble polymer coated web or substrate is prepared in step 206 as hereinafter described. The coated web is then supplied to a vacuum roll coater in roll form as shown in the step 207. In the vacuum roll coater, a thin film multilayer coating can be applied over a given width using a single evaporation source with appropriate masking or can be applied to almost the full width of the vacuum roll coater using multiple evaporative sources and appropriate masking. After coating by vacuum evaporation, the web is removed from the roll coater and is slit to remove any defects or unwanted trim (edge non-uniformities).

During this editing process, the spectral properties of the thin film coating can be ascertained and supplied to a computer to provide a running color average of the coating. This makes it possible to modify the color at a later step as hereinafter described in the event that the color is slightly off the desired color for a particular roll. This makes it possible to custom blend to obtain an exact color by either adding a lower or a higher color. By having available a color profile extending along the width and length of the web, it is possible to ascertain the average color of each given roll. By way of example, if average dominant wave length of a roll is, for example, 495 microns and the desired wavelength is 490 microns, this desired wavelength can be obtained by adding some lower wavelength material having a wavelength of 485 microns to achieve the desired 490 microns.

In the next step 211, the thin film is stripped from the web. By way of example, this can be accomplished by taking the rolls and placing the rolls on an unwind roller and having the web pass through a solvent bath and then being taken up by a wind-up roller. The web as it passes through the solvent bath can pass through a series of rollers which are positioned below the level of the solvent bath. If any of the thin film coating still remains on the web as it emerges from the rollers in the bath, this remaining thin film can be removed by a metal doctor blade which scrapes the remaining thin film from the web. The doctor blade typically is positioned on the outside of the roll on the wind-up side so that any adhering flake will fall back into the solvent bath. As explained previously, the flakes in this operation have a tendency to drop off in sizes of approximately 50 to 200 microns.

The flakes as they fall from the web will fall to the bottom of the tank containing the solvent because they have a much higher specific gravity as, for example, approximately 3 whereas the solvent has a specific gravity of approximately 1. After the seating has occurred, the clear solvent liquid above the flakes can be drained from the upper part of the tank containing the solvent. The flakes can then be removed from the tank and used as hereinafter described. Alternatively, the flakes with the remaining solvent can then be filtered and pulled dry as shown by step 212 by the use of a vacuum filter of a conventional type. Thereafter, fresh solvent is sprayed over the optically variable flakes forming the filter cake remaining in the filter to remove any last traces of the soluble polymer or other extraneous material from the flakes. The filter cake is then removed from the filter and broken up and then laid out to dry in an air oven at atmospheric pressure at a suitable temperature as, for example, 100° C. for a period of time ranging from approximately 8 to 10 hours as also shown by step 212.

After the flakes have been dried, they are placed in a suitable solvent solution, such as acetone or methanol and ultrasonically agitated using a conventional ultrasonic agitator as, for example, a Branson sonic dismembrator for a suitable period as, for example, approximately 1 hour to reduce the particle size to approximately 2–20 microns. Thereafter, the flakes are again filtered to remove the solvent and are air-dryed in an atmospheric oven at a suitable temperature, as for example, 75°–125° C. overnight or until they are dry.

In order to reduce the flakes to a still smaller size, as for example, a size ranging from 2 to 5 microns, the dryed flakes are subjected to an air grind in a suitable impact pulverizer such as one manufactured by Garlock Plastomer Products, a division of Colt Industries on Friends Lane, Newton, Pa. 18940. By way of example, a TX laboratory model of the air impact pulverizer has been utilized to grind alumina up to a rate of 8 pounds an hour using a 10 mesh feed to produce particle sizes down to sub micron size, as for example, 0.65 microns. It has been found by using this air impact pulverizer, 2 to 5 micron size can be readily achieved without destroying the color characteristics of the flakes. It should be appreciated that other grinding techniques can be utilized. However, care must be taken so that the grinding will not destroy the color characteristics of the flakes.

A particularly attractive feature of the air impact process for producing the small size optically variable thin film flakes is that an aspect ratio of at least 2 to 1 can be achieved, and a fairly narrow particle size distribution can be obtained. The aspect ratio is ascertained by taking the largest dimension of a surface of the flake parallel to the planes of the layers of the thin film and a surface (the thickness) perpendicular to the planes of the layers. In addition, the air impact process eliminates the need for additional solvent dispersal and solvent removal steps.

After the flakes have been sized, they can be blended with other flakes to achieve the exact color desired by adding flakes having a higher or lower wavelength to achieve the desired result. This sizing and blending process is represented by step 213 in FIG. 6.

The sized and blended flakes are then introduced into an ink polymer vehicle which consists of a main vehicle with various additives in Step 213.

It should be appreciated that various types of ink vehicle systems can be utilized.

In connection with optically variable inks, it may be desirable to add transparent dyes or pigments to the ink formulation to modify the colors and/or to block unwanted colors. For example, in the case of a gold-to-green shifter, the addition of yellow dyes or yellow transparent pigments blocks the blue reflected light at large viewing angles. Blocking pigments can be added as a separate overprint ink layer or can be mixed directly into the optically variable ink, as shown by step 214. By way of example, if yellow is the color to be utilized, various transparent yellow blocking pigments are available. For example, cromophtal yellow 3G (C. I. pigment yellow 93) can be obtained from the Pigments Department of Ciba-Geigy of Ardsley, N.Y. 10502. Sunset Gold HR Transparent 1281 (C. I. pigment yellow 83) can be obtained from Harshaw Company and Diarylide Yellow Toner AA0A-Transparent 1275 also can be obtained from Harshaw. 11-1405 Novoperm yellow HR Extra Transparent (C.I. pigment yellow 83) can be obtained from American Hoechst Corporation of Coventry, R.I., as well as 11-1424 Novoperm yellow RH-02 and 11-1400 Novoperm yellow HR.

The yellow pigments are typically supplied in a yellow powder of a sub-micron size and are introduced into the ink as it is being mixed and milled to a percentage ranging from 2 to 30% by weight of the resulting optically variable ink. However, in order to achieve a brighter color it is desirable to utilize a lower percentage by weight of color, as for example, approximately 15%. The mixing and milling operation shown by step 213 is carried out to obtain good dispersion of the added pigment. It also causes good dispersion of the flakes which have been added to the paint vehicle. The mixed paint can then be packaged into desirable containers and shipped to the use as shown by step 216.

The optically variable ink produced in accordance with the present invention can be utilized with various conventional printing presses without modification of the presses. For example, the optically variable ink can be utilized in various printing processes, such as lithographic printing, letterpress printing, intaglio printing, gravure printing, screen printing, ink jet printing, and by electrostatic printing. Since the optically variable printing ink can be utilized with printing processes providing high resolution such as Intaglio, lithographic and relief printing, it can be utilized for producing security-type documents. As it is well known to those skilled in the art, the film thickness after it is applied as a wet film on full solid coated paper can have the following thicknesses:

| Process | Microns (approximate)* |
| --- | --- |
| Sheetfed Litho | 5.0 |
| Sheetfed Letterpress | 7.5 |
| Web Offset | 7.5 |
| Web Letterpress | 10 |
| Gravure (Intaglio) | 30 (variable) |
| Screen | 25–125 |

*from 'What The Printers Should Know About Ink' by T. Scarlett and N. Eldred, Graphic Arts Technical Foundation, Pittsburgh, Pa. 15213, 1984, p. 2.

From the above it can be seen that the gravure or the screen ink film thicknesses are greater and thus gives greater color saturation than with the thinner ink films.

The aspect ratio is important in that it helps to ensure that the flakes will land either on their top and bottom sides and not on their ends. It can be appreciated if the flakes fall on their ends, that there would be no color shift from the flake. It is important that the optical variable device by symmetrical so that no matter which side the flake lands on, it still will give a color shift. In other words, the color will be maintained. Thus is certainly is desirable not to have a one-to-one aspect ratio but rather be at least two-to-one or three-to-one. Since the total thickness of the optically variable thin film is approximately 0.9 microns, the 2 micron dimension is approximately the smallest dimension desired for the flakes. By utilizing an aspect ratio of at least 2 to 1 and greater, preferably 5–10, to 1, gives assurance that a major proportion of the flakes land in the ink vehicle with an orientation such that the surfaces providing the color of the flakes will be facing upwardly since the thin film coating is symmetrical and those surfaces have the larger dimensions.

It should be appreciated that with the different wet film thicknesses it is easier to print with thicker layers of material and in addition, this makes it possible to utilize a smaller percentage of optically variable device flakes in the printing media. Thus with gravure it is possible to utilize only 25% by weight of optical variable device flakes whereas with letter press printing and other thinner coatings it is necessary to increase the percentage of optical variable device flakes to 45 to 50% by weight.

If a color shift between two colors with change of viewing angle such as a typical gold-to-green design is desired for an optically variable ink for anti-counterfeiting applications, a five layer symmetrical design of the type MDMDM where M is a metal layer and D is a dielectric layer. The materials used for M and D can be chosen from a wide variety of substances above.

It has been possible to achieve very good color control with optically variable inks. To ascertain this optical variable inks were air brushed onto three different surfaces outlined below.

1. Hi-Gloss Paper
2. Bond Paper
3. Bond Paper With Water Base Base Coat Delta E color measurements based on the CIE Lab color coordinate system were taken. Three samples were chosen to be standards against which all other samples were compared. The Delta E values are charted below:

| | | Standard # | | |
| --- | --- | --- | --- | --- |
| Sample # | | High Gloss 1A | Bond no Base Coat 3A | Bond with Base Coat 5A |
| High | 1A | — | 6.18 | 3.39 |
| Gloss | 2A | 1.62 | 5.36 | 2.56 |
| Paper | 7B | 0.58 | 5.86 | 3.04 |
|  | 8B | 0.31 | 5.93 | 3.15 |
| Bond | 3A | 6.14 | — | 2.95 |
| Paper | 4A | 4.61 | 2.06 | 2.20 |
| No B.C. | 9B | 4.59 | 2.74 | 2.60 |
|  | 10B | 4.71 | 2.67 | 2.62 |
| Bond | 5A | 3.34 | 2.87 | — |
| Paper | 6A | 3.53 | 2.59 | 0.56 |
| WB B.C. | 11B | 2.96 | 3.38 | 0.78 |
|  | 12B | 1.74 | 4.41 | 1.80 |

The above chart taking the—in Column 1A as the standard can be seen that the change in color from the standard in terms of Delta E units is only 1.62, 0.058 and 0.31 which shows that the difference in color from one sample to the next is minimal. For currency type paper, the color change is also very excellent ranging from 0.56 to 0.78 and 1.80. The change in color is so small that for these samples it is undetectable by the human eye. It has been found that when the optical variable ink is applied to paper which does not have a base coat, then the values of delta E are slightly higher because the optically variable device flakes are not lying in a completely flat plane. By utilizing a base coat a more planar surface is provided which proves a surface that gives a higher color purity when the optically variable ink is applied to the same.

In using the yellow pigment blocker in the optically variable ink, the yellow pigment has a tendency to settle above the optically variable pigment since it has a specific gravity of approximately 1 with respect to the optical variable device flakes which have a specific gravity of approximately 3. In certain applications, however, the best approach in blocking out the blue reflected light at high viewing angles is to print a top coat vehicle containing the yellow pigment layer over the optically variable ink layer.

In order to achieve excellent color purity, the optically variable ink must have a good aspect ratio as, for example, as least two-to-one, preferably 5–10 to one, as pointed out above. The optical variable device flakes should not be agglomerated but should be thoroughly dispersed throughout the ink. There should be good overlap of the flakes. The ink should have good flow characteristics. If the paper on which the printing is to occur has a rough surface, a subbing layer may be required for currency type applications where high color purity is desired. Alternatively, calendared currency paper may be very desirable to decrease surface roughness.

As also pointed out previously to obtain good optically variable ink durability, the vehicle itself must be durable and must meet press requirements. It must be able to pose cure, i.e., it must be cross-linked after the print step. As also pointed out previously, air oxidization, catalyst and UV vehicles are available which cross-link after printing. The optically variable device flakes or particles which are provided as a part of the optically variable ink must be inert or alternately, the flakes must be made oleophobic and hydrophobic or, in other words, they must be encapsulated so they will not react with chemicals such as bases or acids.

For a good quality gravure or intaglio ink, the flakes or particle size should be in the range of 5–15 microns. This particle size will allow the desired color purity while still allowing for fine line printing. If fine line printing is not desired, then larger size particles may be used, up to 100 microns or so. For coverage the flake or particle loading or flakes should range 30 to 50% by weight for letterpress and offset and 10 to 30% for gravure and Intaglio.

In the graph in FIG. 7 there is shown the reflectance which can be obtained with a magenta-to-green shifter of the present invention. The curve 221 shows the spectrum of the foil and represents the reflectance of the coating on the polyester web. The curves 222 and 223 are of ink made from optically variable flakes made in accordance with the present invention from the foil which is represented by the curve 221. The spectra of the ink were made from samples prepared from 20% by weight of optically variable pigment in Gotham 66908 resin catalyzed with 2.5% by weight Gotham 66909, cured at 200° F. for four minutes (Gotham Ink and Colors Co., Inc., Long Island City, N.Y. 11101). Curve 222 was obtained from ink prepared from flakes without any grinding (as removed from the web by solvent dissolving the hardcoat/release layer) whereas the other curve 223 was obtained from ink prepared from flakes that had been ground in methanol using ultrasonic dismemberment for 1 hour (Sonifier Cell Disruptor manufactured by Branson Sonic Power Co. set at a power setting of 9). The optical variable flakes in this grinding process were reduced to the size of approximately 5 to 20 microns. As can be seen from the curve 223, this grinding process had a very small deleterious effect on the reflectivity of the optically variable flakes. In addition, it can be seen that there is also very little degradation in the quality, including reflection, compared to the reflection received from the foil itself, before it is removed from the web.

In FIG. 8, there is shown another graph giving the reflectance of a gold-to-green shifter of the present invention without the use of a blue-light blocker. As in the graph in FIG. 7, the graph in FIG. 8 has three curves 231, 232, and 233 in which the curve 231 represents the reflection from the foil on the web, curve 232 represents the reflection from ink utilizing optical variable flakes obtained by removing the optically variable coating from the web by the use of a solvent but without any grinding and the curve 233 represents the reflection obtained from an ink using optical variable flakes which have been ground down to a particle size ranging from 5–20 microns. The inks were prepared in the same way as described in connection with the graph in FIG. 7. Here again it can be seen that the reflectance from the inks is still very good and corresponds very closely to that of the foil itself in that there is little degradation by the grinding of the optically variable flakes to the 10–20 micron size. Note that the peak positions in wavelength for the optically variable ink correspond almost exactly to those for the optically variable coating as prepared on the vacuum roll coated web.

In FIG. 9 there is shown still another graph which shows the reflectance of a gold-to-green ink shifter made in accordance with the present invention with and without the blue-light blocker. This ink was deposited onto a polyester clean film substrate. Curve 241 shows the reflectance from the PET side with an optical variable ink (OVP) utilizing optically variable flakes therein serving to provide a gold-to-green shifter without a blue-light blocker. Curve 242 shows the reflectance from the ink side of the same structure for which the reflectance is shown in curve 241. Curve 243 shows the reflectance from the PET side having a gold-to-green shifter utilizing a blue-light blocker. Curve 244 shows the reflectance from the ink side of the gold-to-green shifter shown in curve 243 using a blue-light blocker in yellow pigment. The ink utilized for the curves shown in FIG. 9 was prepared with three grams of gold-to-green optical variable flakes which had been ultrasonically ground to 5–20 micron particle size. The optical variable flakes were then mixed with 7 grams of varnish catalyzed with 10% catalyst and cured at room temperature. The top two curves 241 and 242 show the reflectance as a function of wavelength when the ink is prepared and cast onto a polyester film and then viewed directly at the coating and also through the polyester film. The lower two curves are similar to those curves described above but are for inks prepared with 9.1% (by total weight) of the blue-light blocker (Cromophthal yellow pigment), optically variable flakes and the polymer vehicle. The Cromophthal yellow is manufactured by Ciba-Geigy, Glen Falls, N.Y. The curves 243 and 244 clearly show how the blue-light blocker in the form of the yellow pigment effectively blocks the blue light at 400 nanometers.

From the foregoing it can be seen that there has been provided an optically variable ink which can serve as a printing ink which can be applied to papers of various types including currency paper. This optically variable ink will exhibit two distinct colors, one color when it is viewed straight on or in a direction normal to the surface of the article on which the optically variable ink appears and another color when viewed at a substantial angle, as for example, 45°. Thus the paper which has an optically variable ink printed thereon can be readily examined by the human eye to ascertain whether or not an optically variable ink is present by merely ascertaining the color shift by change in viewing angle. Transparent pigments and dyes can be used to block out undesired colors in the spectrum between the two desired colors. They also can be used used to block out undesired colors in the spectrum to block out undesired high angle colors. Further, these additives can be used to modify the colors wanted at the various viewing angles. In addition, the use of the optically variable ink makes it impossible to duplicate an article with the same colors on color copiers because only one color can be copied or because the optically variable ink reproduces as block rather than as a color or because the color (at normal incidence) is not faithfully reproduced.

Therefore it can be seen that optically variable inks made in accordance with the present invention have numerous applications. They can be utilized for various decorative purposes. They also can be utilized for anti-counterfeiting purposes in currency type papers, as well as security papers.

The optically variable ink is also advantageous in that it can be utilized with existing printing processes without alteration.

What is claimed is:

1. An article for applying a color shifting optically variable coating on a surface of a substrate, said article comprising a polymeric flexible web which has a length greater than its width so that it can be roll coated in a vacuum chamber and having at least one surface, a release layer disposed on said one surface of the web and a color shifting optically variable coating formed as an inverted structure on said release layer on said one surface of said web, said color shifting optically variable coating consisting of a semi-opaque metal layer on said release layer, a transparent dielectric layer on the semi-opaque metal layer and a reflecting metal layer on the dielectric layer, said article being bonded to a substrate by the use of a hot stamp adhesive either on said color shifting optically variable coating or on the substrate.

* * * * *

UNITED STATES PATENT AND TRADEMARK OFFICE
CERTIFICATE OF CORRECTION

PATENT NO. : 5,648,165
DATED : July 15, 1997
INVENTOR(S) : Phillips et al.

It is certified that error appears in the above-indentified patent and that said Letters Patent is hereby corrected as shown below:

Column 11, line 9: after "performed" cancel "is" and substitute therefor --if--.

Column 13, line 24: cancel "seating" and substitute therefor --settling--.

Column 15, line 25: after "Thus" cancel "is" and substitute therefor --it--;
        line 52: after "layer" and before the period, insert --is used--; and
        line 63: move "Delta E color" from line 63 to line 64.

Column 16, line 21: cancel "0.058" and substitute therefor --0.58--.

Column 18, line 39: cancel "block" and substitute therefor --black--.

Signed and Sealed this

Sixteenth Day of December, 1997

*Attest:*

BRUCE LEHMAN

*Attesting Officer*     Commissioner of Patents and Trademarks